US009697128B2

United States Patent
Cain, III et al.

(10) Patent No.: US 9,697,128 B2
(45) Date of Patent: Jul. 4, 2017

(54) PREFETCH THRESHOLD FOR CACHE RESTORATION

(71) Applicant: International Business Machines Corporation, Armonk, NY (US)

(72) Inventors: Harold W. Cain, III, Raleigh, NC (US); David M. Daly, Croton on Hudson, NY (US); Brian R. Prasky, Campball Hall, NY (US); Vijayalakshmi Srinivasan, New York, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 35 days.

(21) Appl. No.: 14/733,168

(22) Filed: Jun. 8, 2015

(65) Prior Publication Data

US 2016/0357676 A1    Dec. 8, 2016

(51) Int. Cl.
 G06F 12/08 (2016.01)
 G06F 12/0862 (2016.01)
 G06F 9/48 (2006.01)

(52) U.S. Cl.
 CPC ........... *G06F 12/0862* (2013.01); *G06F 9/48* (2013.01); *G06F 9/4887* (2013.01); *G06F 2212/602* (2013.01)

(58) Field of Classification Search
 None
 See application file for complete search history.

(56) References Cited

U.S. PATENT DOCUMENTS

| 4,777,594 | A  |   | 10/1988 | Jones et al. |
| 6,349,365 | B1 |   | 2/2002  | McBride |
| 7,191,319 | B1 | * | 3/2007  | Dwyer ................. G06F 9/3824 711/E12.057 |
| 8,141,098 | B2 |   | 3/2012  | Bradford et al. |
| 8,356,143 | B1 |   | 1/2013  | Bulusu et al. |
| 2004/0117557 | A1 | * | 6/2004 | Paulraj .................... G06F 9/345 711/137 |
| 2004/0128448 | A1 |   | 7/2004  | Stark et al. |
| 2012/0311270 | A1 |   | 12/2012 | Sun et al. |
| 2014/0019689 | A1 | * | 1/2014 | Cain, III ............. G06F 12/0862 711/136 |
| 2016/0062797 | A1 | * | 3/2016 | Holt ...................... G06F 9/4881 718/108 |

FOREIGN PATENT DOCUMENTS

EP    1182567 A1    2/2002

OTHER PUBLICATIONS

D. Zucker, et al., "An Automated Method for Software Controlled Cache Prefetching,"copyright 1998 IEEE; pp. 1-9.

* cited by examiner

*Primary Examiner* — Arpan P. Savla
(74) *Attorney, Agent, or Firm* — Cantor Colburn LLP; Margaret A. McNamara

(57) ABSTRACT

Embodiments relate to a prefetch threshold for cache restoration. An aspect includes determining, based on a task switch from an outgoing task to a current task in a processor, a prefetch threshold for a next task, the prefetch threshold corresponding to an expected runtime of the current task and an amount of time required to prefetch data for the next task. Another aspect includes starting prefetching for the next task while the current task is executing based on the prefetch threshold.

17 Claims, 5 Drawing Sheets

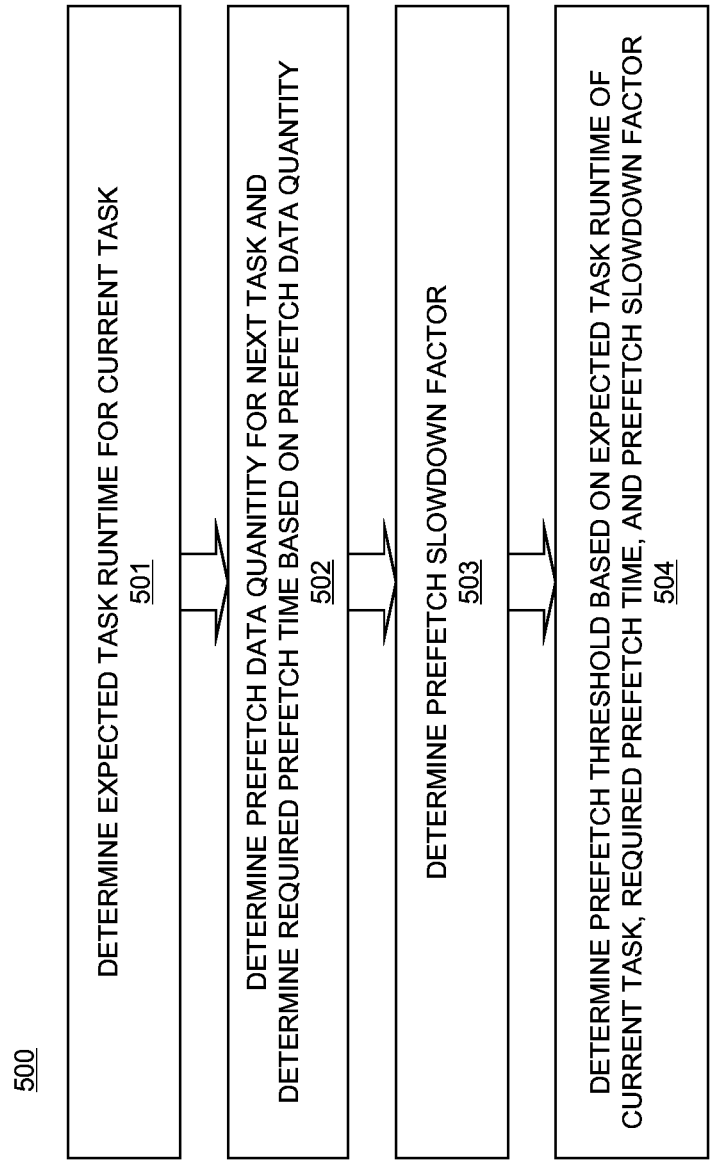

PREFETCH THRESHOLD FOR CACHE RESTORATION

BACKGROUND

The present invention relates generally to cache memory for a computer processor, and more specifically, to a prefetch threshold for cache restoration in a computer processor.

In a computer system, in order to implement parallel execution of various software applications, the operating system (OS) may allot fixed units of time for execution of each thread, or task, referred to as the task's time quantum. A task is allowed to run uninterrupted for its given time quantum before the OS switches to another task, unless an event occurs that prevents the task from completing its time quantum (e.g., the task needs to wait on an input/output (I/O) operation). When a task resumes execution in a subsequent time quantum, entries belonging to that task may no longer be available in the cache, incurring a time penalty. This penalty may be particularly pronounced after, for example, a virtual machine swap from a first partition of the computing system to a second partition. Virtual machine swaps may occur at a level of magnitude longer in latency than task swaps under an OS. As such, after a virtual machine swap, the last time the given program of interest under the OS was run is likely to be further away from the core (further out in memory), and hence the pronounced penalty. The addresses of at least a subset of the cache lines belonging to a task that is not currently executing may be recorded at the time that they are evicted from the cache for prefetching when the task is rescheduled and resumes execution in a subsequent time quantum.

SUMMARY

Embodiments include a method, system, and computer program product for a prefetch threshold for cache restoration. An aspect includes determining, based on a task switch from an outgoing task to a current task in a processor, a prefetch threshold for a next task, the prefetch threshold corresponding to an expected runtime of the current task and an amount of time required to prefetch data for the next task. Another aspect includes starting prefetching for the next task while the current task is executing based on the prefetch threshold.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 5 depicts a process flow for calculating a prefetch threshold for a next task in accordance with an embodiment.

DETAILED DESCRIPTION

Figure 1:
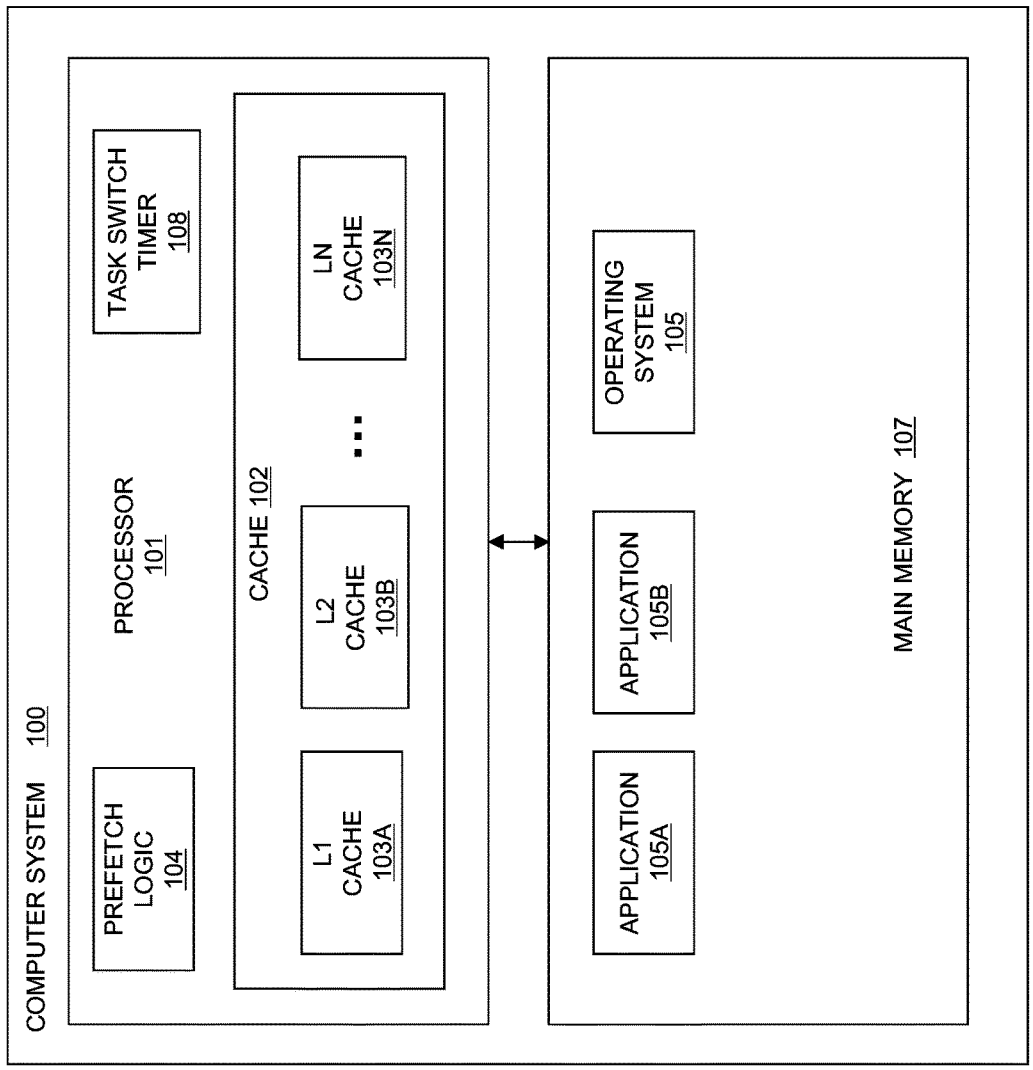
FIG. 1 depicts a computer system for a prefetch threshold for cache restoration in accordance with an embodiment.

Embodiments of a prefetch threshold for cache restoration are provided, with exemplary embodiments being discussed below in detail. The time quantum of a currently executing task in a processor is tracked by a task switch timer that is decremented or incremented at a constant frequency. When the task switch timer reaches zero, or exceeds a threshold, indicating that the current time quantum has elapsed, a timer interrupt is generated, allowing the operating system to schedule and run a next task. The prefetch threshold allows the prefetch logic to begin cache restoration (e.g., prefetching of cache entries) for a next task before the next task is scheduled and executed. The prefetch logic initiates the prefetching for the next task at a predicted time that is given by the prefetch threshold. The prefetch threshold is calculated based on historical execution time(s) of the current thread. The prefetch threshold may be calculated by the prefetch logic for a next thread when the current thread begins execution, and stored in a prefetch threshold register. The prefetch threshold is compared to the task switch timer while the current task executes, and, when the amount of time left in the current task's predicted execution time is equal to the amount of time required for cache restoration for the next task, prefetching is started for the next task. In some embodiments, when the prefetch threshold and the task switch timer are equal, cache restoration prefetching is triggered for the next task.

The prefetch threshold register is set based on a predicted time at which the next task will be rescheduled to execute, minus an estimated ramp-up time required to perform the prefetching. For example, given a sequence of software threads N, N+1, and N+2, that are each allotted time quantums on a hardware thread context, the reschedule time for thread N+1 is predicted by the operating system or virtualization manager based on thread N being scheduled. The reschedule time is determined based on the prior history of thread N's usage of its time quantum, as well as the expected overhead of the scheduler itself. For example, if thread N typically uses its entire time quantum, then the predicted reschedule time for thread N+1 will be duration of thread N's time quantum minus the latency incurred by the prefetch logic performing cache restoration for thread N+1. However, if thread N typically uses only a fraction of its time quantum, then the reschedule time for thread N+1 may be predicted, in various embodiments, based on the duration of thread N's prior execution interval, or based on an average, which may be weighted in any appropriate manner, of some number of thread N's prior execution intervals. For example, if thread N typically uses only half of its allotted time quantum, the reschedule time for thread N+1 will be half of the duration of thread N's time quantum minus the latency incurred by the prefetch logic performing cache restoration for thread N+1

In some embodiments, the estimated ramp-up time is calculated based on the number of cache lines that need to be prefetched for the thread N+1 and the latency of issuing those prefetches, as well as any potential slowdown of thread N due to the prefetches made on behalf of thread N+1 during the end of thread N's time quantum. For example, if it is expected that cache restoration for thread N+1 will require 5000 fetches and each fetch has a default expectation of 100 cycles, the ramp-up time may be calculated to be at most 500,000 cycles, but more realistically one-half or one-quarter of 500,000, so that thread N will not be excessively penalized for the benefit of thread N+1. In some embodiments, the hardware may control the prefetching such that the amount of time that the prefetching overlaps with the execution of the current thread, as scheduled by the OS, is limited as defined by the hardware algorithm (e.g. less than 2% of the runtime). This amount of overlap may be defined to be controllable by the OS for runtime performance optimization. Further, the locations from which the prefetches are made may affect the ramp-up time; for example, a 400 cycle prefetch from main memory may require more time than a 100 cycle prefetch made from a level four (L4) cache.

FIG. 1 illustrates an embodiment of a computer system 100 for a prefetch threshold for cache restoration. Computer system 100 includes a processor 101, which includes a prefetch logic 104 and a cache 102. The cache 102 is a relatively small, fast memory that is located locally to the processor 101. The cache 102 may include any appropriate number of cache levels, such as L1-LN cache levels 103A-N. Lower-level cache, such as L1 cache 103A, is smaller and faster than higher-level cache, such as LN cache 103N. The processor 101 runs an operating system (OS) 105, which is stored in main memory 107. The OS 105 controls the execution of other computer programs, such as applications 105A-B, and provides scheduling, input-output control, file and data management, memory management, and communication control and related services in computer system 100. The processor 101 may be, in various embodiments, a single or a multithreaded processor that switches between a plurality of software threads, or tasks, during execution of applications such as applications 105A-B. Processor 101 further includes a task switch timer 108, which measures the time quantum of a currently executing task to determine when the next task switch is scheduled to take place. The OS performs the actual task switch based on a hardware interrupt that transitions the processor from executing a user program to the OS. A call to the OS to perform a task switch in processor 101 may be triggered by either the time slice being expired, based on task switch timer 108, or by the current task encountering, before the current task's time quantum has expired, an operation with an associated interrupt, such as an I/O or synchronization operation, that much be completed before the current task can proceed with execution. FIG. 1 is shown for illustrative purposes only; for example, a cache may have any appropriate number of cache levels. Further, the OS may be any appropriate OS, and, in some embodiments, a computer system may run more than one OS, each in respective partitions. Further, any appropriate number of applications may run simultaneously on a computer system 100, in various partitions up to a maximum supported by the total cores multiplied by the hardware threads that are supported per core.

Figure 2:
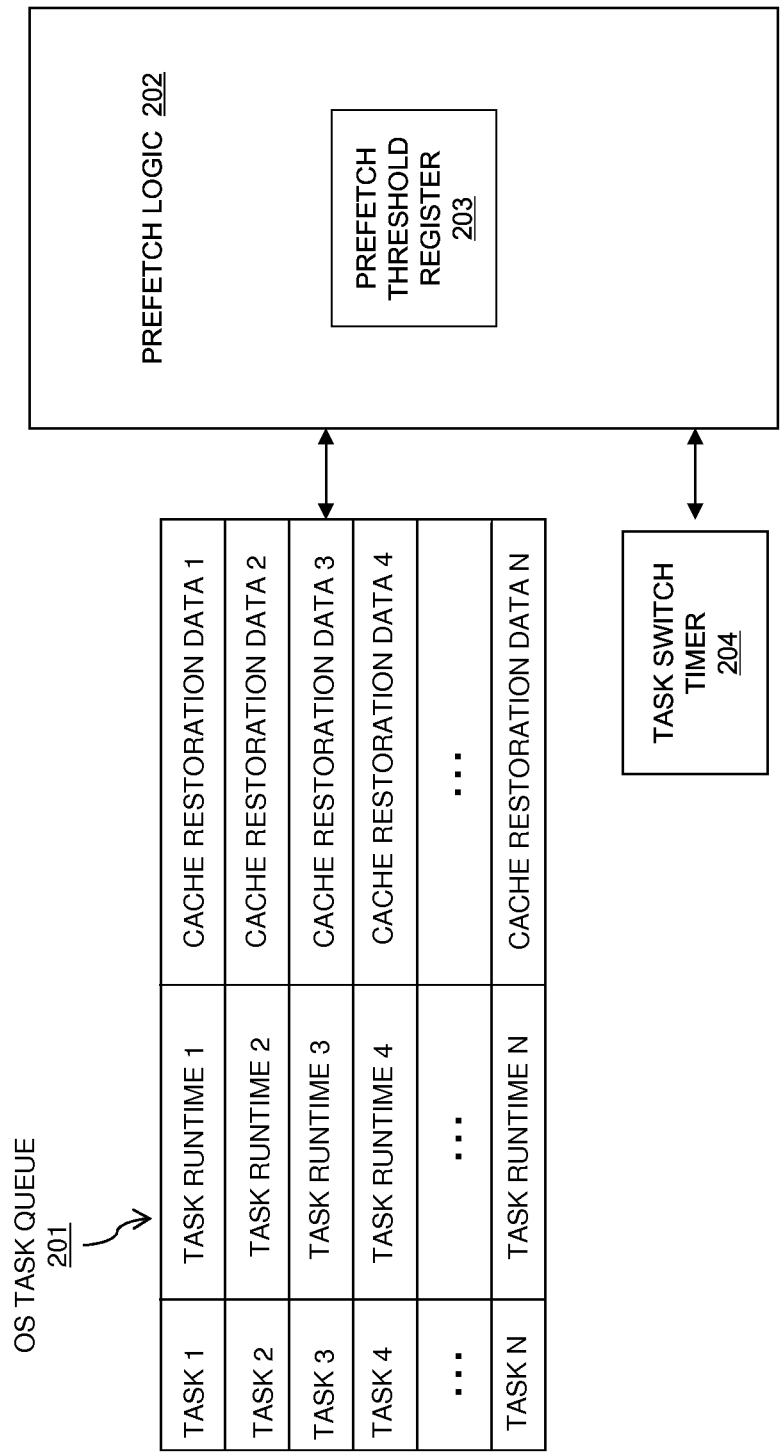
FIG. 2 depicts a task queue and a prefetch logic for a prefetch threshold for cache restoration in accordance with an embodiment.

FIG. 2 depicts an embodiment of an OS task queue 201 and a prefetch logic 202 for a prefetch threshold for task switching. OS task queue 201 is a queue of the tasks that are being executed by the processor 101 in a time shared manner in subsequent time quantums; the OS task queue 201 is maintained by the OS 105 of FIG. 1. As shown in FIG. 2, each entry in the OS task queue 201 includes a task (or software thread) identifier 1 to N. Each of the tasks 1 to N has a respective task runtime value and cache restoration data stored in the OS task queue 201. The task runtime value is a field that gives an expected amount of time each task will run when it is next scheduled, based on the prior history of the task's usage of its time quantum. The cache restoration data indicates for each task what data need to be fetched into the cache by the prefetch logic 202 for cache restoration when the task is rescheduled. Prefetch logic 202 corresponds to prefetch logic 104 of FIG. 1, and includes a prefetch threshold register 203. Prefetch logic 202 is further in communication with a task switch timer 204, which corresponds to task switch timer 108 of FIG. 1. FIG. 2 is shown for illustrative purposes only; for example, an OS task queue may include any appropriate number of entries; the various entries may be stored in any appropriate location in a computer system 100, and each of the various entries may include any appropriate number and type of additional fields to give further information regarding the tasks that are stored in the OS task queue.

The restoration of the cache involves saving off of data that was known to be last good in the task upon encountering a task swap. When a task swap occurs, the data for the task that is being swapped out (e.g., LRU replaced over time in the cache) is saved off into a hardware defined stack. This hardware stack may be a reserved space in the system's memory that is not directly individually accessible by the software programs including the OS running on the machine. The amount of data saved off is hardware defined, and in some embodiments may be limited to only the L1 cache or multiple levels of cache hierarchy. The amount of data saved may also be limited to only the MRU or a fraction of the non-LRU ways of a cache level. While the OS may handle the restoration, restoration may also be performed done independently of the OS. The cache restoration data, which is stored in each entry of the OS task queue 201 of FIG. 2, may represent a pointer in memory to the location where the restoration data is stored. This pointer may be a set of data already known by the OS, for example, a conglomerate of the software task ID and the PC (Program Counter . . . the instruction address from where the program is to continue executing from). It is the data that is saved off in this stack within memory that is to be restored. The stack may be of finite maximum size, and the data saved off may be less than the maximum amount of data that is allowed to be saved off.

Figure 3:
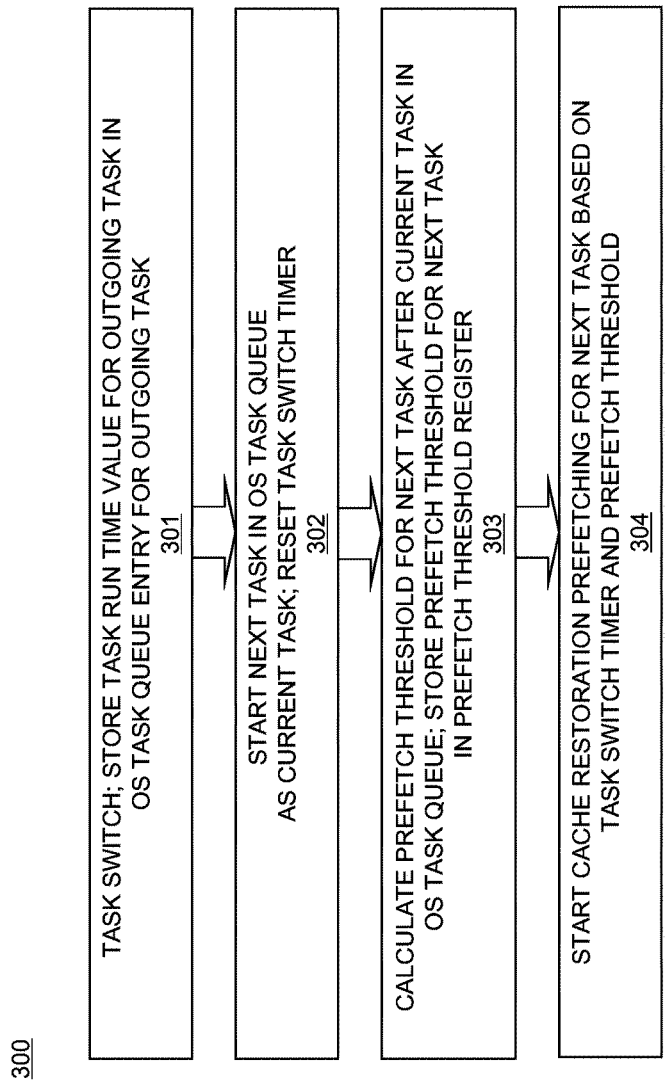
FIG. 3 depicts a process flow for a prefetch threshold for cache restoration in accordance with an embodiment.

FIG. 3 depicts an embodiment of a method 300 for a prefetch threshold for cache restoration. FIG. 3 is discussed with respect to FIGS. 1-2. First, in block 301, there is a task switch in processor 101 from an outgoing task to a next task. In block 301, a task runtime value for the outgoing task is updated in the entry corresponding to the outgoing task in the OS task queue 201 based on the amount of time the outgoing task just completed running. Calculation of the updated task runtime value is discussed in further detail below with respect to FIG. 4. In an example, Task 1, as shown in OS task queue 201, may be the outgoing task, and the task runtime 1 field is updated based on the amount of time that Task 1 just ran. The task switch of block 301 may be triggered by the task switch timer 108/204 indicating that Task 1's time quantum has expired, or by Task 1 encountering, for example, an I/O or synchronization operation that must be completed before Task 1 can proceed with execution.

Next, in block 302, the next task in the OS task queue 201 is started as the current task in processor 101, and the task switch timer 108/204 is reset. For example, Task 2 in the OS task queue 201 is scheduled and begins executing in block 302. Then, in block 303, the prefetch threshold for the next task in the OS task queue 201 is determined, and the determined prefetch threshold is stored in prefetch threshold register 203. For example, in block 303, the prefetch threshold is determined for Task 3 in the OS task queue 201 while Task 2 is executing. Calculation of the prefetch threshold is discussed in further detail with respect to FIG. 5. Then, in block 304, when the amount of time left in the current task's predicted execution time, as given by the task switch timer 108/204, is equal to the amount of time needed for cache restoration for the next task as given by the prefetch threshold, prefetching for the next task is started during the current task's time quantum. For example, prefetching for Task 3, based on cache restoration data 3 in OS task queue 201, is started by prefetch logic 104/202 while Task 2 finishes executing. Then, when there is a task switch from Task 2 to Task 3, the data last used for Task 3 is already back in the cache 102. In some embodiments of block 304, the prefetching may be triggered when task switch timer 108/204 is equal to the prefetch threshold. Blocks 301-304 of method 300 are repeated for each task switch in processor 101.

Figure 4:
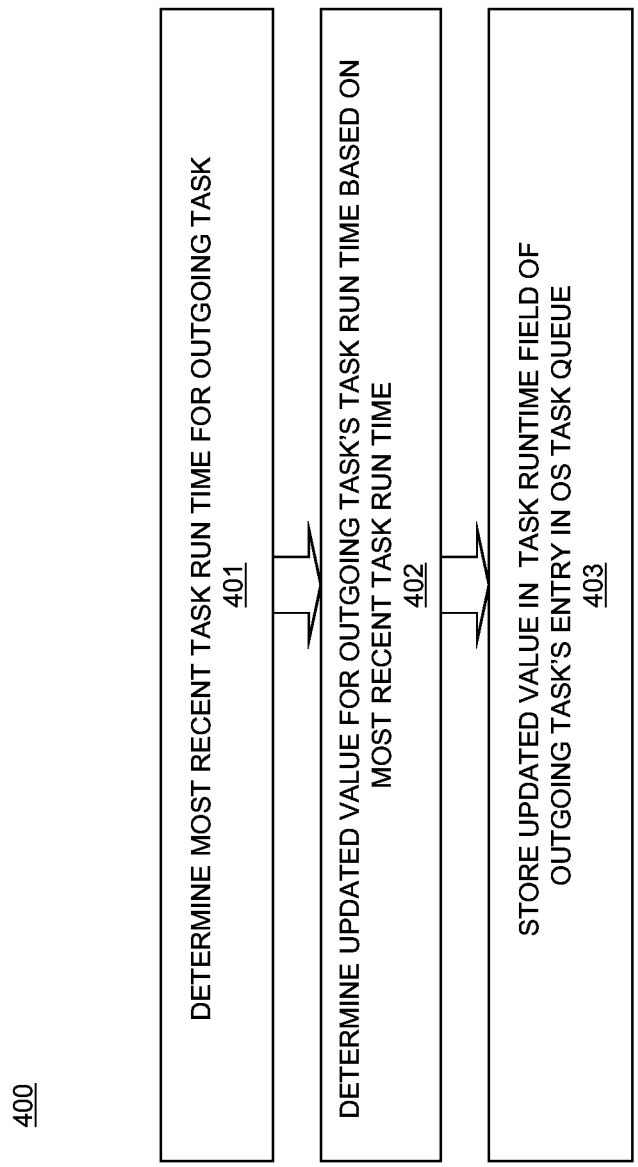
FIG. 4 depicts a process flow for a updating a runtime value for an outgoing task in an OS task queue in accordance with an embodiment.

FIG. 4 depicts an embodiment of a method 400 for updating a runtime value for an outgoing task in the OS task queue. Method 400 is performed in block 301 of FIG. 3. First, in block 401, the most recent task runtime for the outgoing task is determined. Next, in block 402, an updated task runtime value for the outgoing task is determined based on the most recent task runtime. In some embodiments, the updated value may be the most recent task runtime. In other embodiments, the updated value may be an average of the most recent task runtime and the historical task runtime value that is stored in the task runtime field in the outgoing task's entry in the OS task queue 201. The average may be a weighted average in some embodiments; for example, more weight may be given to either the most recent task runtime or the task runtime value that is stored in the task runtime field in the outgoing task's entry in the OS task queue 201 in various embodiments. Lastly, in block 403, the updated value that was calculated in block 402 is inserted into the outgoing task's task runtime field in the OS task queue 201.

FIG. 5 depicts an embodiment of a method 500 for calculating a prefetch threshold for a next task. Method 500 is performed in block 303 of FIG. 3. Method 500 may be implemented in prefetch logic 104/202. First, in block 501, the expected task runtime of the currently executing task is determined. The expected task runtime of the current task is given by the task runtime field in the entry corresponding to the current task in the OS task queue 201. Next, in block 502, the quantity of data that needs to be prefetched for the next task is determined, and the amount of time required to prefetch the determined quantity of data is determined. The quantity of data that needs to be prefetched for the next task is given by the cache restoration data field in the entry corresponding to the next task in the OS task queue 201. The amount of time required to prefetch the cache restoration data for the next task may be determined by multiplying the number of required prefetches by the amount of time per prefetch in some embodiments. The amount of time per prefetch may be determined based on the location(s) of the prefetch data. For example, a prefetch of data from main memory to an L1 cache may take longer than a prefetch of data from an L4 cache to an L1 cache. In some embodiments of block 502, the prefetch logic 104/202 may issue some sample prefetches for the next task based on the next task's cache restoration data in order to estimate the amount of time required to prefetch all of the next task's cache restoration data. Next, in block 503, a prefetch slowdown factor is determined. The prefetch slowdown factor is an amount of time that the current task will be slowed down by the prefetching that is being performed for the next task while the current task is executing. Lastly, in block 504, the prefetch threshold for the next task is determined based on the expected task runtime of the current task that was determined in block 501, the required prefetch time that was determined in block 502, and the slowdown factor that was determined in block 503. In some embodiments, the prefetch threshold may be calculated by subtracting the required prefetch time from the summation of the prefetch slowdown factor and the expected task runtime, where the summation cannot exceed the maximum time allotted per the running software thread as per the allotted time quantum to run as controlled by the task switch timer 108.

Technical effects and benefits include relatively efficient cache restoration in a processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for a prefetch threshold for cache restoration, the method comprising:
    determining, based on a task switch from an outgoing task to a current task in a processor, a prefetch threshold for a next task, the prefetch threshold corresponding to an expected runtime of the current task and an amount of time required to prefetch data for the next task;
    starting prefetching for the next task while the current task is executing based on the prefetch threshold;
    determining a most recent runtime for the outgoing task; and
    determining an updated expected runtime for the outgoing task based on the most recent runtime of the outgoing task.

2. The method of claim 1, wherein the updated expected runtime is the most recent runtime.

3. The method of claim 1, wherein the updated expected runtime comprises an average of the most recent runtime and a historical runtime value of the outgoing task.

4. The method of claim 3, wherein the historical runtime value comprises a value taken from a runtime value field in an entry corresponding to the outgoing task in an operating system (OS) task queue; and further comprising:
    inserting the updated expected runtime for the outgoing task into the runtime value field in the entry corresponding to the outgoing task in the operating system (OS) task queue.

5. The method of claim 1, wherein the expected runtime of the current task is determined based on a runtime value field in an entry corresponding to the current task in the OS task queue, and wherein the amount of time required to prefetch data for the next task is determined based on a cache restoration data field in an entry corresponding to the next task in an OS task queue and an amount of time required per prefetch.

6. The method of claim 1, wherein the prefetch threshold further corresponds to a slowdown factor corresponding to an amount of slowdown expected in the execution of the current task due to performing the prefetching for the next task.

7. The method of claim 1, wherein the prefetch threshold is stored in a prefetch register, and wherein the prefetching is started for the next task based on the prefetch threshold that is stored in the prefetch register being equal to a task switch timer of the processor.

8. A computer program product for implementing a prefetch threshold for cache restoration, the computer program product comprising:
    a non-transitory computer readable storage medium having program instructions embodied therewith, the program instructions readable by a processing circuit to cause the processing circuit to perform a method comprising:

determining, based on a task switch from an outgoing task to a current task in a processor, a prefetch threshold for a next task, the prefetch threshold corresponding to an expected runtime of the current task and an amount of time required to prefetch data for the next task;

starting prefetching for the next task while the current task is executing based on the prefetch threshold;

determining a most recent runtime for the outgoing task; and determining an updated expected runtime for the outgoing task based on the most recent runtime of the outgoing task.

9. The computer program product of claim 8, wherein the updated expected runtime is the most recent runtime.

10. The computer program product of claim 8, wherein the updated expected runtime comprises an average of the most recent runtime and a historical runtime value of the outgoing task.

11. The computer program product of claim 10, wherein the historical runtime value comprises a value taken from a runtime value field in an entry corresponding to the outgoing task in an operating system (OS) task queue; and further comprising:

inserting the updated expected runtime for the outgoing task into the runtime value field in the entry corresponding to the outgoing task in the operating system (OS) task queue.

12. The computer program product of claim 8, wherein the expected runtime of the current task is determined based on a runtime value field in an entry corresponding to the current task in the OS task queue, and wherein the amount of time required to prefetch data for the next task is determined based on a cache restoration data field in an entry corresponding to the next task in an OS task queue and an amount of time required per prefetch.

13. The computer program product of claim 8, wherein the prefetch threshold further corresponds to a slowdown factor corresponding to an amount of slowdown expected in the execution of the current task due to performing the prefetching for the next task.

14. A computer system for a prefetch threshold for cache restoration, the system comprising:

a memory; and a processor, communicatively coupled to said memory, the computer system configured to perform a method comprising:

determining, based on a task switch from an outgoing task to a current task in a processor, a prefetch threshold for a next task, the prefetch threshold corresponding to an expected runtime of the current task and an amount of time required to prefetch data for the next task;

starting prefetching for the next task while the current task is executing based on the prefetch threshold;

determining a most recent runtime for the outgoing task; and determining an updated expected runtime for the outgoing task based on the most recent runtime of the outgoing task.

15. The system of claim 14, wherein the updated expected runtime comprises an average of the most recent runtime and a historical runtime value of the outgoing task.

16. The system of claim 15, wherein the historical runtime value comprises a value taken from a runtime value field in an entry corresponding to the outgoing task in an operating system (OS) task queue; and further comprising:

inserting the updated expected runtime for the outgoing task into the runtime value field in the entry corresponding to the outgoing task in the operating system (OS) task queue.

17. The system of claim 14, wherein the expected runtime of the current task is determined based on a runtime value field in an entry corresponding to the current task in the OS task queue, and wherein the amount of time required to prefetch data for the next task is determined based on a cache restoration data field in an entry corresponding to the next task in an OS task queue and an amount of time required per prefetch.

* * * * *